(12) United States Patent
Baumann et al.

(10) Patent No.: US 10,103,535 B2
(45) Date of Patent: Oct. 16, 2018

(54) ELECTRICAL PROTECTIVE ARRANGEMENT FOR AN ELECTRICAL INSTALLATION, AND ASSOCIATED METHOD

(71) Applicant: SIEMENS AKTIENGESELLSCHAFT, Munich (DE)

(72) Inventors: Mathias Baumann, Zirndorf (DE); Michael Strassburger, Ensdorf (DE)

(73) Assignee: Siemens Aktiengesellschaft, Munchen (DE)

( * ) Notice: Subject to any disclaimer, the term of this patent is extended or adjusted under 35 U.S.C. 154(b) by 408 days.

(21) Appl. No.: 14/607,259

(22) Filed: Jan. 28, 2015

(65) Prior Publication Data

US 2015/0214716 A1 Jul. 30, 2015

(30) Foreign Application Priority Data

Jan. 28, 2014 (DE) .................. 10 2014 201 505

(51) Int. Cl.
 *H02H 3/00* (2006.01)
 *H02H 3/08* (2006.01)
(52) U.S. Cl.
 CPC .............. *H02H 3/08* (2013.01); *H02H 3/006* (2013.01)
(58) Field of Classification Search
 CPC ................................. H02H 3/08; H02H 3/006
 USPC ....................................................... 361/2, 42
 See application file for complete search history.

(56) References Cited

U.S. PATENT DOCUMENTS

| | | |
|---|---|---|
| 5,982,596 A | 11/1999 | Spencer et al. |
| 6,628,496 B2 | 9/2003 | Montjean |
| 6,798,630 B1 | 9/2004 | Del Vecchio et al. |
| 7,579,963 B2 | 8/2009 | Viaro et al. |
| 2003/0042016 A1* | 3/2003 | Vinegar ............... E21B 47/06 166/66 |
| 2004/0160718 A1 | 8/2004 | Haensgen et al. |
| 2010/0121500 A1 | 5/2010 | Karandikar et al. |
| 2011/0310521 A1 | 12/2011 | Dauer et al. |
| 2013/0329331 A1 | 12/2013 | Erger et al. |

FOREIGN PATENT DOCUMENTS

| | | |
|---|---|---|
| CN | 1360379 A | 7/2002 |
| CN | 101505052 A | 8/2009 |
| CN | 101900771 A | 12/2010 |

(Continued)

OTHER PUBLICATIONS

Eaton "Wiring Manual 2011", updated Editon 2011, publication date Jun. 2011, Bonn, Chapter 7, p. 1-23, p. 7-2 and pp. 7-20-7-24.

*Primary Examiner* — Thienvu Tran
*Assistant Examiner* — Lucy Thomas
(74) *Attorney, Agent, or Firm* — Laurence Greenberg; Werner Stemer; Ralph Locher

(57) ABSTRACT

An electrical protective arrangement for an electrical installation has a fault current protection apparatus with a detection device for sensing a fault current and an evaluation device for comparing the sensed fault current with a threshold value. A tripping signal is output by the evaluation device if the sensed fault current exceeds the threshold value. A communication module is configured to send fault current data with information pertaining to the sensed fault current and to receive operating data for setting an operating state for the evaluation device.

9 Claims, 1 Drawing Sheet

(56) References Cited

FOREIGN PATENT DOCUMENTS

| DE | 102008031335 A1 | 1/2010 |
|----|-----------------|--------|
| DE | 102011089591 A1 | 6/2013 |
| WO | 2005101604 A1 | 10/2005 |

* cited by examiner

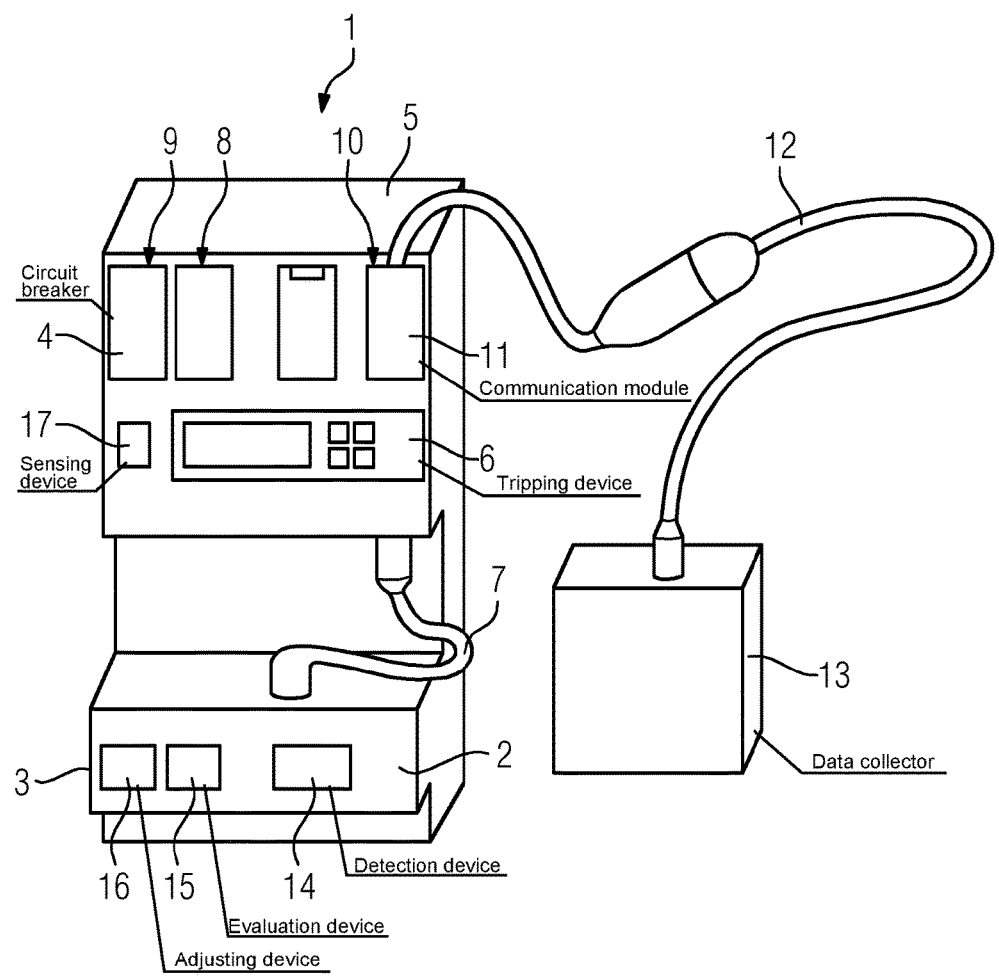

ELECTRICAL PROTECTIVE ARRANGEMENT FOR AN ELECTRICAL INSTALLATION, AND ASSOCIATED METHOD

CROSS-REFERENCE TO RELATED APPLICATION

This application claims the priority, under 35 U.S.C. § 119, of German patent application DE 10 2014 201 505.7, filed Jan. 28, 2014; the prior application is herewith incorporated by reference in its entirety.

BACKGROUND OF THE INVENTION

Field of the Invention

The present invention relates to an electrical protective arrangement for an electrical installation having a fault current protection apparatus that has a detection device for sensing a fault current and an evaluation device for comparing the sensed fault current with a threshold value and for outputting a tripping signal if the sensed fault current exceeds the threshold value. Furthermore, the present invention relates to a method for operating an electrical protective arrangement for an electrical installation.

Electrical protective arrangements of this kind can be used in buildings or in industrial installations, for example. The electrical protective arrangements may comprise a fault current protection apparatus and a circuit breaker. Fault current protection apparatuses, which are in the form of differential current devices or fault current devices, for example, afford fault protection in low-voltage systems in the event that a basic insulation fails or that live parts are touched directly. This prevents or reduces damage to human beings, material assets and livestock.

Fault current protection apparatuses can be added to standard circuit breakers or they can be realized as an external, modular solution. Alternatively, the fault current protection apparatuses may be integrated in compact circuit breakers. If a fault current then arises during operation of the installation, it is detected by the fault current protection apparatus, and the latter trips the relevant (compact) circuit breaker and therefore isolates the installation.

Special types of fault current protection apparatuses are provided with so-called shunt trips as a tripping device. Shunt trips are electromechanical systems, particularly on a magnet basis, that can be used to produce a movement, particularly for a latching mechanism, from an actuating signal as a result of a fault current. In the specific case, a shunt trip can also be called a tripping magnet. Depending on the function, a distinction is drawn for the shunt trips between voltage trips and undervoltage trips. Voltage trips trip (i.e., they produce a mechanical movement) when a voltage threshold is exceeded. Undervoltage trips trip when a voltage threshold is undershot.

The fault current protection apparatus and the circuit breaker are usually arranged in separate housings. The circuit breaker may have a housing that contains one or more accessory pockets. Into such an accessory pocket it is possible to place the aforementioned shunt trip, an auxiliary switch, an alarm switch or the like. These modular accessories can thus be used to individualize an electrical protective arrangement, which may comprise a circuit breaker and a fault current protection apparatus.

In the case of solutions to date, the fault current protection apparatus usually has electrical contacts at which it is possible to tap off operating data that describe an operating state for the evaluation device of the fault current protection apparatus. By way of example, such operating states may be a tripped signal, a pre-alarm signal or the like. Said signals can also be indicated remotely, for example by means of an indicator light. Furthermore, it is also known practice to actuate a tripping device of an electrical protective arrangement remotely for test tripping. The use is limited, however, since maximum line lengths limit the range. By way of example, twisted lines with a maximum length of 300 meters can be connected to electrical contacts for test tripping a fault current protection apparatus.

SUMMARY OF THE INVENTION

It is accordingly an object of the invention to provide an electrical protective arrangement and method which overcomes the above-mentioned and other disadvantages of the heretofore-known devices and methods of this general type and which provides for an electrical protective arrangement with a fault current protection apparatus that can be operated relatively easily and reliably.

With the foregoing and other objects in view there is provided, in accordance with the invention, an electrical protective arrangement for an electrical installation, the protective arrangement comprising:

a fault current protection apparatus having a detection device for sensing a fault current and an evaluation device for comparing the sensed fault current with a threshold value and for outputting a tripping signal if the sensed fault current exceeds the threshold value; and a communication module configured to transmit fault current data with information pertaining to the sensed fault current and to receive operating data for setting an operating state of said evaluation device.

In other words, the electrical protective arrangement for an electrical installation comprises fault current protection apparatus that has a detection device for sensing a fault current and an evaluation device for comparing the sensed fault current with a threshold value and for outputting a tripping signal if the sensed fault current exceeds the threshold value, and a communication module that is designed to send fault current data that comprise information pertaining to the sensed fault current and to receive operating data for setting an operating state for the evaluation device.

The electrical protective arrangement comprises a fault current protection apparatus that in turn has a detection device that can be used to sense a fault current. Said detection device may be in the form of a summation current transformer, for example. Furthermore, the fault current protection apparatus comprises an evaluation device, that is to say corresponding evaluation electronics, that can compare the sensed fault current with a threshold value. If the sensed fault current exceeds the predetermined threshold value, a tripping signal is output by means of the evaluation device. Said tripping signal can be output to a tripping device that can be used to trip a switching device or a latching mechanism. As a result of this, the electrical lines of the electrical installation are DC isolated.

According to the invention, the electrical protective arrangement additionally comprises a communication module. Said communication module is connected to the fault current protection apparatus, particularly to the evaluation device of the fault current protection apparatus, for the purpose of data transmission. Hence, fault current data that characterize the sensed fault current can be sent from the communication module to a communication system, for example. Furthermore, the communication module can be used to receive operating data that can be used to set an operating state for the evaluation device. In this way, the fault current protection apparatus can be linked to a communication system. The fault current protection apparatus is therefore rendered able to communicate.

Preferably, the detection device is designed to sense a plurality of temporally successive measured values for the fault current, and the fault current data comprise the plurality of measured values. By way of example, the differential current between at least two electrical lines of the electrical installation can be sensed at predetermined instants. Said fault current data can be transmitted by means of the communication module to a communication system and can be provided there. In this way, the measured values can also be provided remotely. Hence, there is no need for a presence in situ in order to monitor the electrical installation. If the electrical protective arrangement is used in an installation, it can be monitored remotely. Hence, the fault current data can provide an early warning in good time.

In a further refinement, the fault current protection apparatus comprises an adjusting device for setting the operating state of the evaluation device on the basis of the received operating data. By way of example, the adjusting device may comprise corresponding electronics. Alternatively, the adjusting device may comprise corresponding actuators or motors that can be used to adapt the operating state of the evaluation device. The adjusting device can be actuated as appropriate by the received operating data. Hence, the operating state of the evaluation device can easily be adapted remotely.

In addition, it is advantageous if the operating state that can be set is the threshold value and/or a time delay after which the tripping signal is output. This provides a simple way of adapting the threshold value for the electrical current intensity that, when exceeded, prompts the output of a tripping signal. The same applies to the time delay of the tripping signal, which can be set as appropriate.

Preferably, the protective arrangement comprises a tripping device for tripping a switching device, and the communication module is designed to receive a control signal for tripping the tripping device. This allows a function test on the fault current protection apparatus remotely.

In a further refinement, the communication module is designed to send state variables that comprise a piece of information about the present operating state of the evaluation device. It is thus possible, by way of example, to read the settings for the threshold value and/or the time delay for the tripping signal. In addition, it is possible to poll whether the fault current protection apparatus is operational. Hence, faster fault diagnosis can be provided by the up-to-date status signals. If the electrical protective arrangement is used in an installation, for example, this results in a reduction of installation downtimes.

In addition, it is advantageous if the communication module is connected to an external communication system that comprises a control room. The fault current data and the operating data can be transmitted, particularly as digital signals, via a communication bus. Hence, the product data from the fault current protection apparatus can be read in a control room. In addition, the fault current protection apparatus can be operated from the control room.

In a further embodiment, the fault current protection apparatus is supplied with electric power by means of the communication system. In this way, it is possible to guarantee reliable operation of the fault current protection apparatus. This is advantageous particularly when the fault current protection apparatus is otherwise supplied with electric power from the electrical installation and the electrical connection is isolated in the event of a fault.

In addition, it is advantageous if the electrical protective arrangement comprises a circuit breaker that has an electrical sensing device for sensing an overcurrent and/or a short, the circuit breaker is arranged in a separate housing that has a plurality of accessory pockets, and the communication module is arranged in one of the plurality of accessory pockets. This allows the provision of an electrical protective arrangement that affords particular savings in terms of installation space.

In a further refinement, the fault current protection apparatus is connected to the electrical sensing device of the circuit breaker by means of a data cable, and the electrical sensing device is connected to the communication module. If the circuit breaker has a corresponding communication module that is arranged in the accessory pocket thereof, the fault current protection apparatus may be connected to the electrical sensing device, which can also be called an ETU (electronic trip unit), by means of an appropriate data cable or a data bus. The electronic sensing device is in turn connected to the communication module for the purpose of data transmission. This allows the fault current protection apparatus to be linked to a communication system.

With the above and other objects in view there is also provided, in accordance with the invention, a method of operating an electrical protective arrangement for an electrical installation. The method comprises the following steps, to be performed in any order:

sensing a fault current using a detection device of a fault current protection apparatus;

transmitting with a communication module fault current data containing information pertaining to the sensed fault current;

receiving with the communication module operating data for setting an operating state of an evaluation device of the fault current protection apparatus;

comparing the sensed fault current with a threshold value using the evaluation device; and outputting a tripping signal with the evaluation device if the sensed fault current exceeds the threshold value.

In other words, the method according to the invention for operating an electrical protective arrangement for an electrical installation comprises the sensing of a fault current using a detection device of a fault current protection apparatus, the comparison of the sensed fault current with a threshold value using an evaluation device for the fault current protection apparatus, the output of a tripping signal if the sensed fault current exceeds the threshold value using the evaluation device, the transmission of fault current data that comprise a piece of information pertaining to the sensed fault current using a communication module, and the reception of operating data for setting an operating state for the evaluation device using the communication module.

The advantages and developments described in the present case in connection with the electrical protective arrangement according to the invention apply mutatis mutandis to the method according to the invention.

Other features which are considered as characteristic for the invention are set forth in the appended claims.

Although the invention is illustrated and described herein as embodied in an electrical protective arrangement for an electrical installation, and associated method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is a schematic illustration of an electrical protective arrangement with a fault current protection apparatus and a circuit breaker.

DETAILED DESCRIPTION OF THE INVENTION

Referring now to the FIGURE of the drawing in detail, there is shown an electrical protective arrangement 1 which comprises a fault current protection apparatus 2, which may also be referred to as an RCD (residual current protective device). The fault current protection apparatus 2 may be a differential current device or a conventional fault current protection device. In this case, the fault current protection apparatus 2, as shown by way of example in the FIGURE, has a housing 3. Furthermore, the electrical protective arrangement 1 comprises a circuit breaker 4 that is arranged in a separate housing 5. The housing 3 of the fault current protection apparatus 2 and the housing 5 of the circuit breaker 4 can be connected to one another in a form-fit manner (i.e., positively connected, form-lock). Typically, the fault current protection apparatus 2 and the circuit breaker 4 are accommodated in switchgear cabinets, where they are connected to the relevant busbars.

The circuit breaker 4 can also be called a master switch and is used for switching currents and voltages, as are possible in production installations, residential buildings and the like, for example. The circuit breaker 4 usually comprises an electrical sensing device 17, not shown in more detail here, which can also be called an ETU (electronic trip unit). The electrical sensing device 17 may comprise a current transformer that can be used to sense voltages and electrical current intensities in the electrical lines. From the voltages and/or electrical current intensities, it is possible to ascertain whether there is an overcurrent or a short. Furthermore, the circuit breaker 4 comprises a tripping device 6, which is shown only schematically in the present case. The tripping device 6 can be used to trip a switching device of the circuit breaker if an overcurrent and/or a short has been sensed by means of the electrical sensing device 17.

The fault current protection apparatus 2 comprises a detection device 14, not shown here, that is capable of detecting a fault current or a differential current in the electrical installation or in the system. By way of example, the detection device 14 is a differential current protection device or a fault current protection device. The detection device 14 comprises a summation current transformer, the output signal from which is different than zero when there is a fault current or a differential current. The output signal from the summation current transformer is supplied to a computation unit of the fault current protection apparatus 2, which is used to compare the output signal with a threshold value. If the threshold value is exceeded, a corresponding tripping signal is output.

In the present case, the fault current protection apparatus 2 or the evaluation device 15 thereof is connected to the circuit breaker 4 by means of a cable 7 for the purpose of data transmission. By way of example, the cable 7 may be in the form of a data bus. In particular, the cable 7 is connected to the electrical sensing device of the circuit breaker 4. The housing 5 of the circuit breaker 4 may comprise a plurality of accessory pockets. In the present exemplary embodiment, the housing 5 comprises three accessory pockets 8, 9, 10. In the present case, the right-hand accessory pocket 10 contains a communication module 11. The communication module 11 is connected to the electrical sensing device of the circuit breaker 4 for the purpose of data transmission. This provides data communication between the fault current protection apparatus 2, particularly the evaluation device 15 for the fault current protection apparatus 2, and the communication module 11.

The detection device 14 of the fault current protection apparatus 2 can sense measured values pertaining to the fault current or pertaining to the differential current at predetermined intervals of time. Furthermore, state data that comprise a piece of information about the present operating state of the evaluation device 15 can be provided. If need be, these data can be digitized using an appropriate computation device of the fault current protection apparatus 2 and then transmitted via the evaluation device 15 via the cable 7 to the electronic sensing device and from there to the communication module 11. The communication module 11 is connected to a communication system. In the present exemplary embodiment, this is illustrated by the data cable 12. The data cable 12 is in turn connected to a data collector 13 that can be used to collect and concentrate the data. From the data collector 13, there may be a further data connection to a communication system that comprises a control room.

In addition, the communication module 11 can be used to receive data for the fault current protection apparatus 2. By way of example, the communication module 11 can be used to receive operating data that can be used to set an operating state for the evaluation device 15. By way of example, a threshold value that, when exceeded, prompts the output of a tripping signal can be set. Similarly, a time delay after which the tripping signal is output can be set. In addition, it is conceivable for the communication device 11 to be used to receive a control signal that is used to actuate the tripping device 6.

In this way, the electrical protective arrangement 1 and particularly the fault current protection apparatus 2 can be incorporated into a communication system. By way of example, the communication system may be designed on the basis of the PROFIBUS standard (process field bus), the PROFINET standard (cf., www.profibus.org; www.profinet.com), the Ethernet standard or the like. The communication system means that there is no longer a need for a presence in situ in order to obtain up-to-date information pertaining to the fault current. This results in a time savings. If the electrical protection arrangement 1 is used in an installation, for example, monitoring of the installation remotely becomes possible. By way of example, it is thus possible to provide an early warning in good time, which avoids installation stoppages. The use of a bus system means that there is no range limitation for the transmission of the data. Furthermore, fast fault diagnosis can be provided. Finally, reading of the operating data from the fault current protection apparatus 2 allows faster device exchange. This can reduce service times.

The fault current protection apparatus 2 includes an adjusting device 16 for setting the operating state of the evaluation device 15 on the basis of the operating data received thereby.

The following is a summary list of reference numerals and the corresponding structure used in the above description of the invention:

1 Electrical protective arrangement
2 Fault current protection apparatus
3 Housing
4 Circuit breaker
5 Housing
6 Tripping device
7 Cable
8, 9, 10 Accessory pocket
11 Communication module
12 Data line
13 Data collector

The invention claimed is:

1. An electrical protective arrangement for an electrical installation, the protective arrangement comprising:
   a fault current protection apparatus having a detection device for sensing a fault current and an evaluation device for comparing the sensed fault current with a threshold value and for outputting a tripping signal if the sensed fault current exceeds the threshold value; and
   a communication module configured to transmit fault current data with information pertaining to the sensed fault current and to receive operating data for setting an operating state of said evaluation device;
   wherein said communication module is connected to an external communication system that comprises a control room; and
   wherein in normal operation said fault current protection apparatus is supplied with electric power from the electrical installation and, in an event of a fault when an electrical connection is isolated, said fault current protection apparatus is supplied with electrical power that is sent from the communication system.

2. The electrical protective arrangement according to claim 1, wherein said detection device is configured to sense a plurality of temporally successive measured values for the fault current and wherein the fault current data comprise the plurality of measured values.

3. The electrical protective arrangement according to claim 1, wherein said fault current protection apparatus comprises an adjusting device for setting the operating state of the evaluation device on the basis of the operating data received thereby.

4. The electrical protective arrangement according to claim 3, wherein the operating state to be set is one or both of the threshold value or a time delay after which the tripping signal is output.

5. The electrical protective arrangement according to claim 1, which further comprises a tripping device for tripping a switching device, and wherein said communication module is configured to receive a control signal for tripping said tripping device.

6. The electrical protective arrangement according to claim 1, wherein said communication module is configured to send state data that comprise a piece of information about a present operating state of said evaluation device.

7. The electrical protective arrangement according to claim 1, further comprising a circuit breaker having an electrical sensing device for sensing an overcurrent and/or a short, said circuit breaker being disposed in a separate housing that has a plurality of accessory pockets, and said communication module being disposed in one of said plurality of accessory pockets.

8. The electrical protective arrangement according to claim 7, wherein said fault current protection apparatus is connected to said electrical sensing device of said circuit breaker by way of a data cable, and said electrical sensing device is connected to said communication module.

9. A method of operating an electrical protective arrangement for an electrical installation, the method comprising:
   in normal operation, supplying a fault current protection apparatus with electric power from the electrical installation;
   in an event of a fault when an electrical connection is isolated, supplying the fault current protection apparatus with electrical power that is sent from an external communication system that includes a control room;
   sensing a fault current using a detection device of the fault current protection apparatus;
   transmitting with a communication module fault current data containing information pertaining to the sensed fault current, wherein the communication module is connected to the external communication system that includes the control room;
   receiving with the communication module operating data for setting an operating state of an evaluation device of the fault current protection apparatus;
   comparing the sensed fault current with a threshold value using the evaluation device; and
   outputting a tripping signal with the evaluation device if the sensed fault current exceeds the threshold value.

* * * * *